United States Patent
Tobin et al.

(10) Patent No.: US 12,377,617 B2
(45) Date of Patent: Aug. 5, 2025

(54) SYSTEM AND METHOD FOR MANUFACTURING PANELS FOR USE IN WIND TURBINE ROTOR BLADE COMPONENTS

(71) Applicant: General Electric Company, Schenectady, NY (US)

(72) Inventors: James Robert Tobin, Greenville, SC (US); Andrew McCalip, Houston, TX (US); Lauren Laurer Watts, Lyman, SC (US); Hongyi Zhou, Schenectady, NY (US); Huijuan Dai, Simpsonville, SC (US); Collin McKee Sheppard, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 578 days.

(21) Appl. No.: 17/627,198

(22) PCT Filed: Jul. 16, 2019

(86) PCT No.: PCT/US2019/041905
§ 371 (c)(1),
(2) Date: Jan. 14, 2022

(87) PCT Pub. No.: WO2021/010980
PCT Pub. Date: Jan. 21, 2021

(65) Prior Publication Data
US 2022/0260050 A1 Aug. 18, 2022

(51) Int. Cl.
*B29C 70/50* (2006.01)
*B29C 35/08* (2006.01)
(Continued)

(52) U.S. Cl.
CPC .............. *B29C 70/50* (2013.01); *B29C 43/44* (2013.01); *B29C 43/52* (2013.01);
(Continued)

(58) Field of Classification Search
CPC ......... B29C 70/50; B29C 43/44; B29C 43/52; B29C 2035/0838; B29C 2035/1658;
(Continued)

(56) References Cited

U.S. PATENT DOCUMENTS 2,135,763 A * 11/1938 Nicholson ............... B30B 5/062
425/363
2,884,078 A   4/1959 Stamm et al.
(Continued)

FOREIGN PATENT DOCUMENTS

AU    2011304537 B2    3/2012
CA       2517951 A1    9/2004
(Continued)

OTHER PUBLICATIONS

Chinese Office Action with Translation, Nov. 13, 2023.
PCT International Search Report & Written Opinion Corresponding to PCT/US2019/041905 Mar. 19, 2020.

*Primary Examiner* — Jerzi H Moreno Hernandez
(74) *Attorney, Agent, or Firm* — Dority & Manning, P.A.

(57) ABSTRACT

A system for manufacturing a panel includes a support frame, a first caul plate arranged atop the support frame, a second caul plate arranged atop the first caul plate, and a heating assembly having a housing defining an inlet and an outlet. The housing includes one or more heaters. The heater(s) is configured to generate heat and the housing is configured to generate a first pressurized gas film. Thus, one or more layers of material to be consolidated may be placed between the first and second caul plates and drawn through the heating assembly as the heating assembly applies pressure to the one or more layers of material to be consolidated (Continued)

via the first pressurized gas film in combination with applying the heat via the one or more heaters, thereby consolidating the panel.

15 Claims, 10 Drawing Sheets

(51) Int. Cl.
| | |
|---|---|
| *B29C 43/32* | (2006.01) |
| *B29C 43/36* | (2006.01) |
| *B29C 43/44* | (2006.01) |
| *B29C 43/52* | (2006.01) |
| B29C 35/16 | (2006.01) |
| B29C 43/34 | (2006.01) |
| B29L 31/08 | (2006.01) |

(52) U.S. Cl.
CPC ........... *B29C 2035/0838* (2013.01); *B29C 2035/1658* (2013.01); *B29C 2043/3233* (2013.01); *B29C 2043/3466* (2013.01); *B29C 2043/3655* (2013.01); *B29L 2031/085* (2013.01)

(58) Field of Classification Search
CPC .... B29C 2043/3233; B29C 2043/3466; B29C 2043/3655
See application file for complete search history.

(56) References Cited

U.S. PATENT DOCUMENTS

| | | | |
|---|---|---|---|
| 4,186,044 A | 1/1980 | Bradley et al. | |
| 4,329,119 A | 5/1982 | Baskin | |
| 4,474,536 A | 10/1984 | Gougeon et al. | |
| 5,328,744 A | 7/1994 | Kaufmann et al. | |
| 5,476,704 A | 12/1995 | Köhler | |
| 5,591,369 A | 1/1997 | Matsen et al. | |
| 6,264,877 B1 | 7/2001 | Pallu De La Barriere | |
| 7,473,385 B2 | 1/2009 | Stiesdal et al. | |
| 7,503,752 B2 | 3/2009 | Gunneskov et al. | |
| 7,625,185 B2 | 12/2009 | Wobben | |
| 7,637,721 B2 | 12/2009 | Driver et al. | |
| 7,654,799 B2 | 2/2010 | Eyb | |
| 7,854,594 B2 | 12/2010 | Judge | |
| 7,922,454 B1 | 4/2011 | Riddell | |
| 8,057,189 B2 | 11/2011 | Riahi | |
| 8,079,818 B2 | 12/2011 | Burchardt et al. | |
| 8,114,329 B2 | 2/2012 | Karem | |
| 8,142,162 B2 | 3/2012 | Godsk et al. | |
| 8,147,209 B2 | 4/2012 | Godsk et al. | |
| 8,168,027 B2 | 5/2012 | Jacobsen et al. | |
| 8,172,538 B2 | 5/2012 | Hancock et al. | |
| 8,262,361 B2 | 9/2012 | Sanz Pascual et al. | |
| 8,297,932 B2 | 10/2012 | Arocena De La Rua et al. | |
| 8,297,933 B2 | 10/2012 | Riahi | |
| 8,317,479 B2 | 11/2012 | Vronsky et al. | |
| 8,348,622 B2 | 1/2013 | Bech | |
| 8,353,674 B2 | 1/2013 | Bech | |
| 8,455,090 B2 | 6/2013 | Schmidt et al. | |
| 8,506,258 B2 | 8/2013 | Baker et al. | |
| 8,511,996 B2 | 8/2013 | Llorente Gonzalez et al. | |
| 8,517,689 B2 | 8/2013 | Kyriakides et al. | |
| 8,540,491 B2 | 9/2013 | Gruhn et al. | |
| 8,545,744 B2 | 10/2013 | Jones | |
| 8,580,060 B2 | 11/2013 | Bech | |
| 8,657,581 B2 | 2/2014 | Pilpel et al. | |
| 8,673,106 B1 | 3/2014 | Jolley et al. | |
| 8,696,317 B2 | 4/2014 | Rudling | |
| 8,747,098 B1 | 6/2014 | Johnson et al. | |
| 8,764,401 B2 | 7/2014 | Hayden et al. | |
| 8,826,534 B2 | 9/2014 | Cappelli et al. | |
| 8,827,655 B2 | 9/2014 | Bech | |
| 8,894,374 B2 | 11/2014 | Fuglsang et al. | |
| 8,918,997 B2 | 12/2014 | Kyriakides et al. | |
| 8,961,142 B2 | 2/2015 | Wansink | |
| 8,992,813 B2 | 3/2015 | Robbins et al. | |
| 9,790,919 B2 | 10/2017 | Leonard et al. | |
| 2003/0155351 A1* | 8/2003 | Vilo ........... | H05B 6/788 219/701 |
| 2006/0233905 A1* | 10/2006 | Vilo ........... | B30B 5/062 425/363 |
| 2007/0036659 A1 | 2/2007 | Hibbard | |
| 2007/0113974 A1 | 5/2007 | Blandin et al. | |
| 2009/0148300 A1 | 6/2009 | Driver et al. | |
| 2010/0098549 A1 | 4/2010 | Mironov | |
| 2011/0030183 A1 | 2/2011 | Livingston et al. | |
| 2011/0031758 A1 | 2/2011 | Mitsuoka et al. | |
| 2011/0037191 A1 | 2/2011 | Stiesdal | |
| 2011/0045276 A1 | 2/2011 | Grove-Nielsen | |
| 2011/0103962 A1 | 5/2011 | Hayden et al. | |
| 2011/0114252 A1 | 5/2011 | Partington et al. | |
| 2011/0142662 A1 | 6/2011 | Fritz et al. | |
| 2011/0318186 A1 | 12/2011 | Kristensen et al. | |
| 2012/0034096 A1 | 2/2012 | Appleton | |
| 2012/0039720 A1 | 2/2012 | Bech | |
| 2012/0180582 A1 | 7/2012 | Piasecki | |
| 2012/0183408 A1 | 7/2012 | Noerlem | |
| 2012/0230830 A1 | 9/2012 | Lind et al. | |
| 2012/0237356 A1 | 9/2012 | Mironov | |
| 2012/0257984 A1 | 10/2012 | Frederiksen | |
| 2013/0012086 A1 | 1/2013 | Jones et al. | |
| 2013/0022466 A1 | 1/2013 | Laurberg | |
| 2013/0108453 A1 | 5/2013 | Baker et al. | |
| 2013/0149166 A1 | 6/2013 | Schibsbye | |
| 2013/0164133 A1 | 6/2013 | Grove-Neilsen | |
| 2013/0195661 A1 | 8/2013 | Lind et al. | |
| 2013/0231018 A1 | 9/2013 | Kruger et al. | |
| 2013/0333823 A1 | 12/2013 | Hedges et al. | |
| 2014/0003955 A1 | 1/2014 | Richter | |
| 2014/0003956 A1 | 1/2014 | Lull et al. | |
| 2014/0023513 A1 | 1/2014 | Johnson et al. | |
| 2014/0030094 A1 | 1/2014 | Dahl et al. | |
| 2014/0119936 A1 | 5/2014 | Dahl et al. | |
| 2014/0295187 A1 | 10/2014 | Jacobsen et al. | |
| 2015/0224760 A1 | 8/2015 | Eyb et al. | |
| 2016/0377050 A1 | 12/2016 | Caruso et al. | |
| 2016/0377052 A1* | 12/2016 | Caruso ........... | F03D 1/0675 264/279 |
| 2018/0022045 A1 | 1/2018 | Sebastian et al. | |

FOREIGN PATENT DOCUMENTS

| | | |
|---|---|---|
| CA | 2526407 C | 12/2004 |
| CN | 1030044 A | 1/1989 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| DE | 102011051172 A1 | 12/2012 |
| DE | 102018108731 A1 | 10/2018 |
| DK | 201270816 A | 1/2014 |
| DK | 201270818 A | 1/2014 |
| EP | 2113373 B1 | 1/2011 |
| EP | 2363602 A2 | 9/2011 |
| EP | 2434152 A2 | 3/2012 |
| EP | 2255957 B1 | 7/2013 |
| EP | 2617558 A1 | 7/2013 |
| EP | 2679804 A1 | 1/2014 |
| EP | 2679806 A1 | 1/2014 |
| EP | 2682256 A1 | 1/2014 |
| EP | 2687557 A1 | 1/2014 |
| EP | 2455419 B1 | 3/2014 |
| EP | 1808598 B1 | 4/2014 |
| EP | 2752577 A2 | 7/2014 |
| GB | 2451192 A | 1/2009 |
| GB | 2455044 A | 6/2009 |
| GB | 2464539 A | 4/2010 |
| GB | 2485453 A | 5/2012 |
| JP | H01110114 A | 4/1989 |
| JP | 2002137307 A | 5/2002 |
| JP | 2007092716 A | 4/2007 |

(56) References Cited

FOREIGN PATENT DOCUMENTS

| | | |
|---|---|---|
| JP | 3930200 B2 | 6/2007 |
| JP | 2009235306 A | 10/2009 |
| JP | 2014015567 A | 1/2014 |
| JP | 5439412 B2 | 3/2014 |
| WO | WO03082551 A1 | 10/2003 |
| WO | WO2007/051465 A1 | 5/2007 |
| WO | WO2008/086805 A2 | 7/2008 |
| WO | WO2009/118545 A1 | 10/2009 |
| WO | WO2010/025830 A2 | 3/2010 |
| WO | WO2010/057502 A2 | 5/2010 |
| WO | WO2010/083921 A2 | 7/2010 |
| WO | WO2011/088835 A2 | 7/2011 |
| WO | WO2011/098785 A2 | 8/2011 |
| WO | WO2011/113812 A1 | 9/2011 |
| WO | WO2012/010293 A1 | 1/2012 |
| WO | WO2012/042261 A1 | 4/2012 |
| WO | WO2012/140039 A2 | 10/2012 |
| WO | WO2012/161741 A2 | 11/2012 |
| WO | WO2013/007351 A1 | 1/2013 |
| WO | WO2013/060582 A1 | 5/2013 |
| WO | WO2013/087078 A1 | 6/2013 |
| WO | WO2013/091639 A2 | 6/2013 |
| WO | WO2013/178228 A1 | 12/2013 |
| WO | WO2014/001537 A1 | 1/2014 |
| WO | WO2014/044280 A1 | 3/2014 |
| WO | WO2014/063944 A1 | 5/2014 |
| WO | WO2014/079456 A1 | 5/2014 |
| WO | WO2014/079565 A2 | 5/2014 |
| WO | WO2015/015202 A1 | 2/2015 |

\* cited by examiner

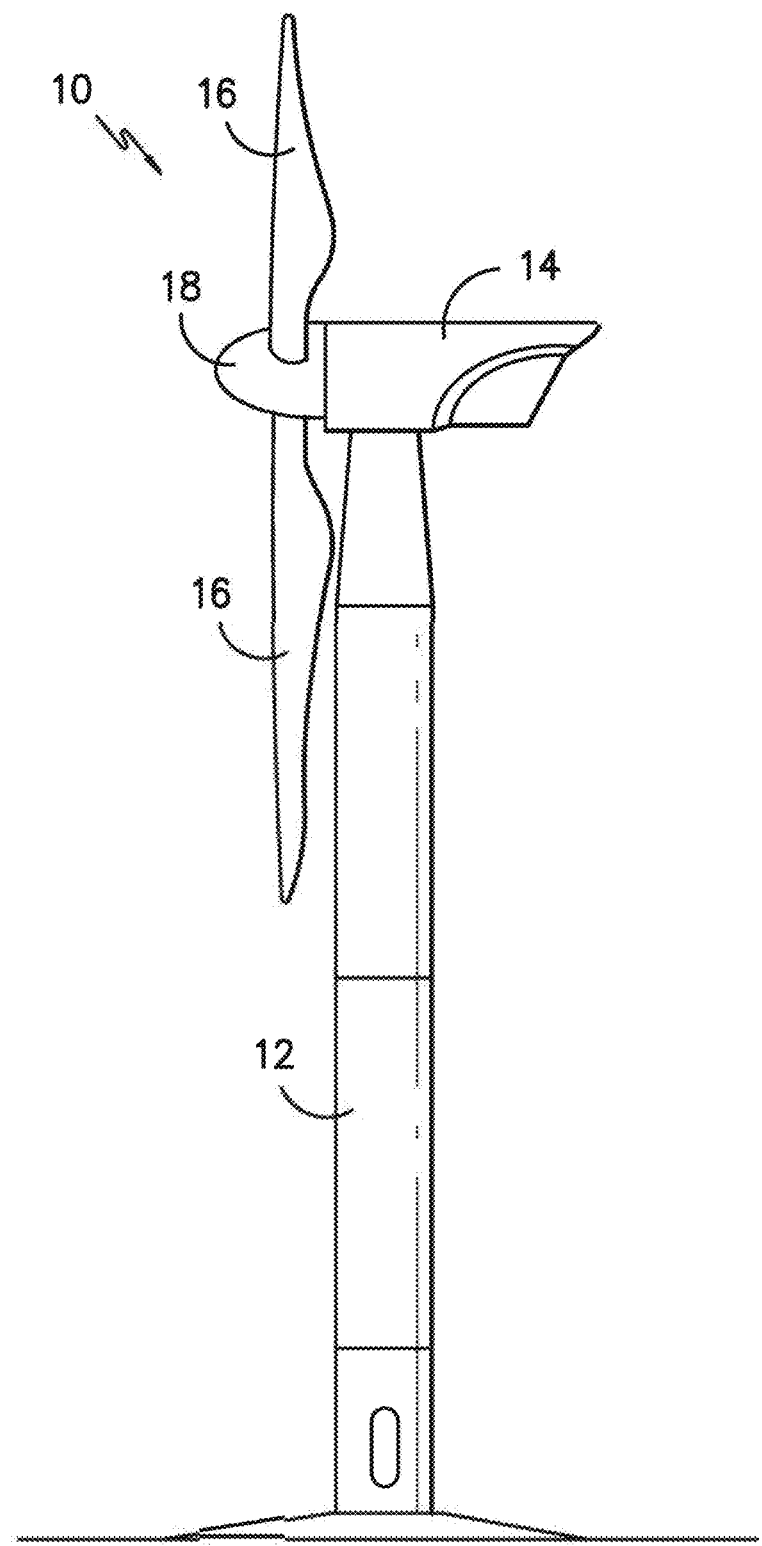
FIG. -1-
[Prior art]

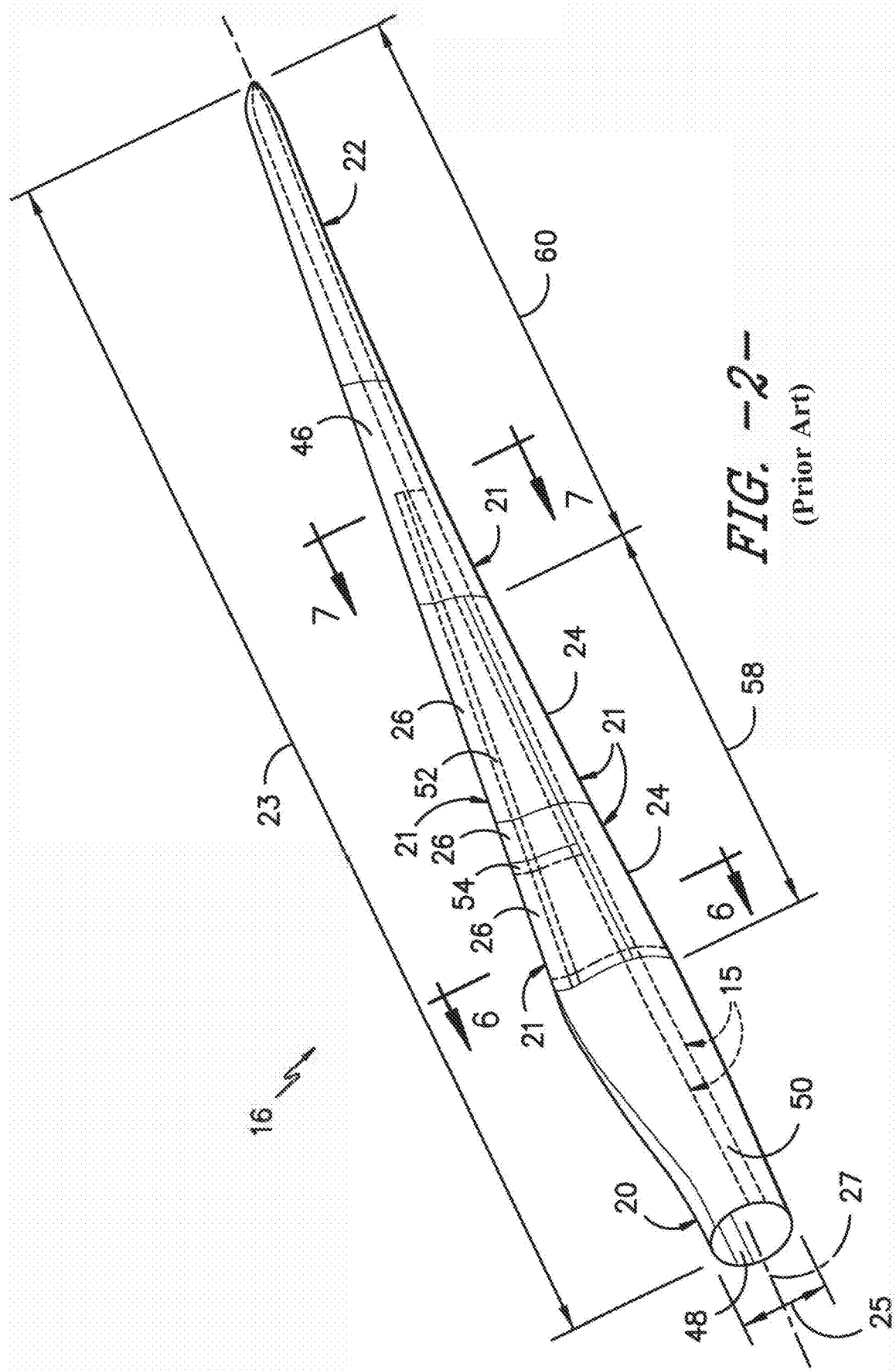
FIG. -2-
(Prior Art)

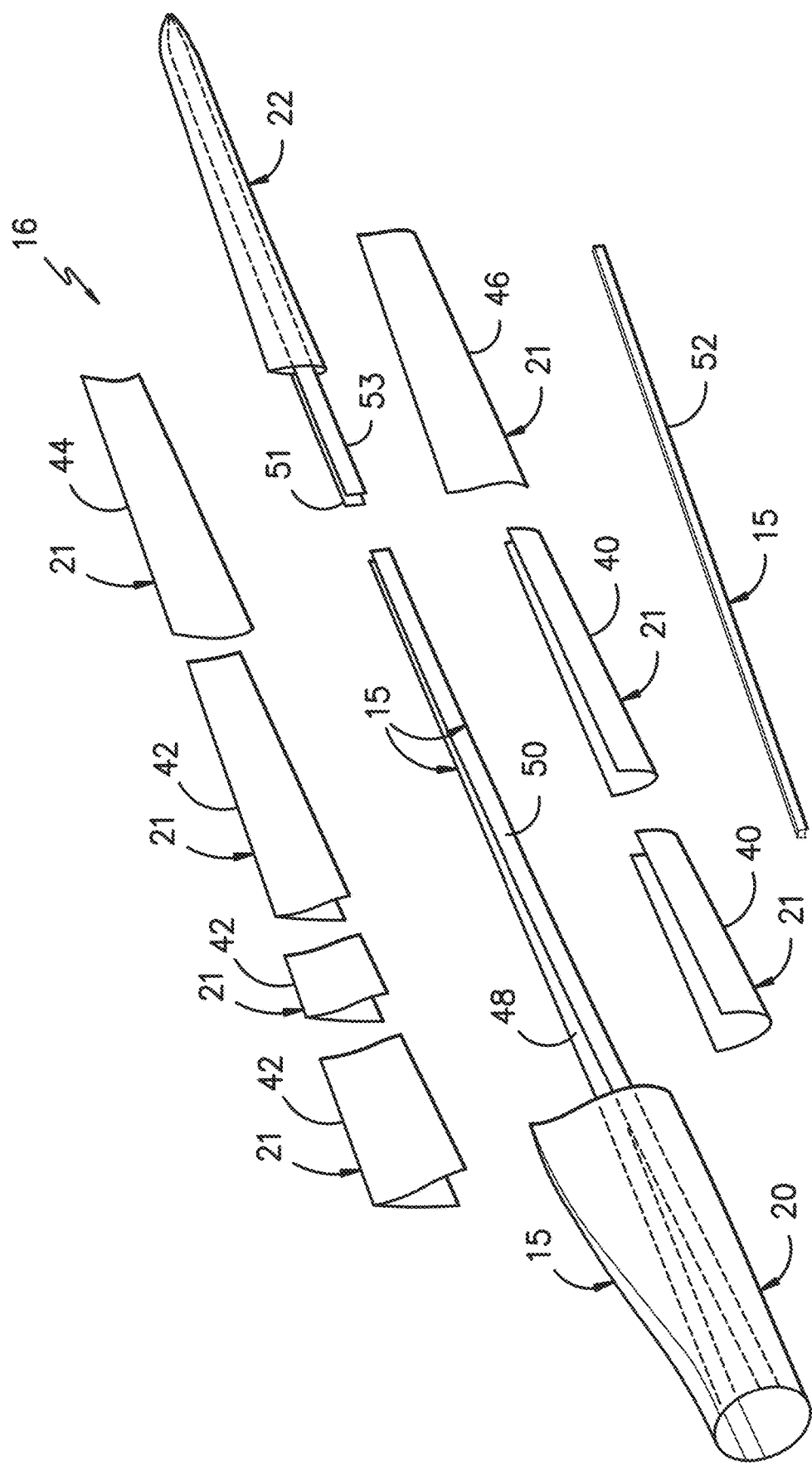
FIG. -3-
(Prior Art)

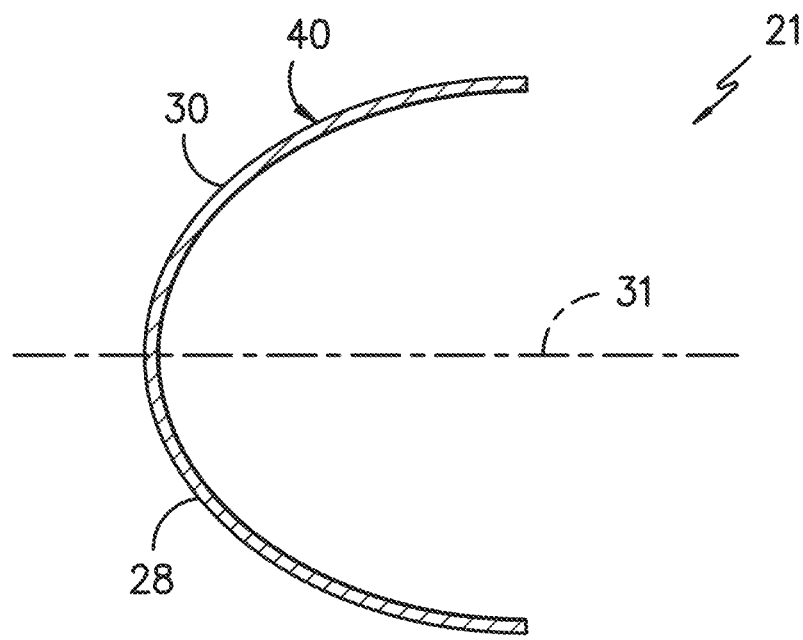
FIG. -4-
(Prior Art)
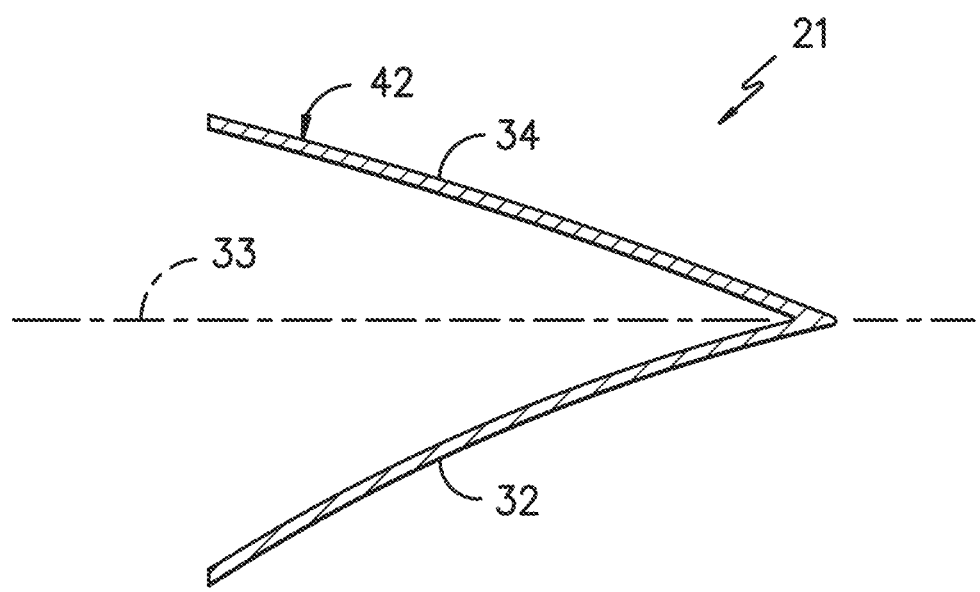
FIG. -5-
(Prior Art)

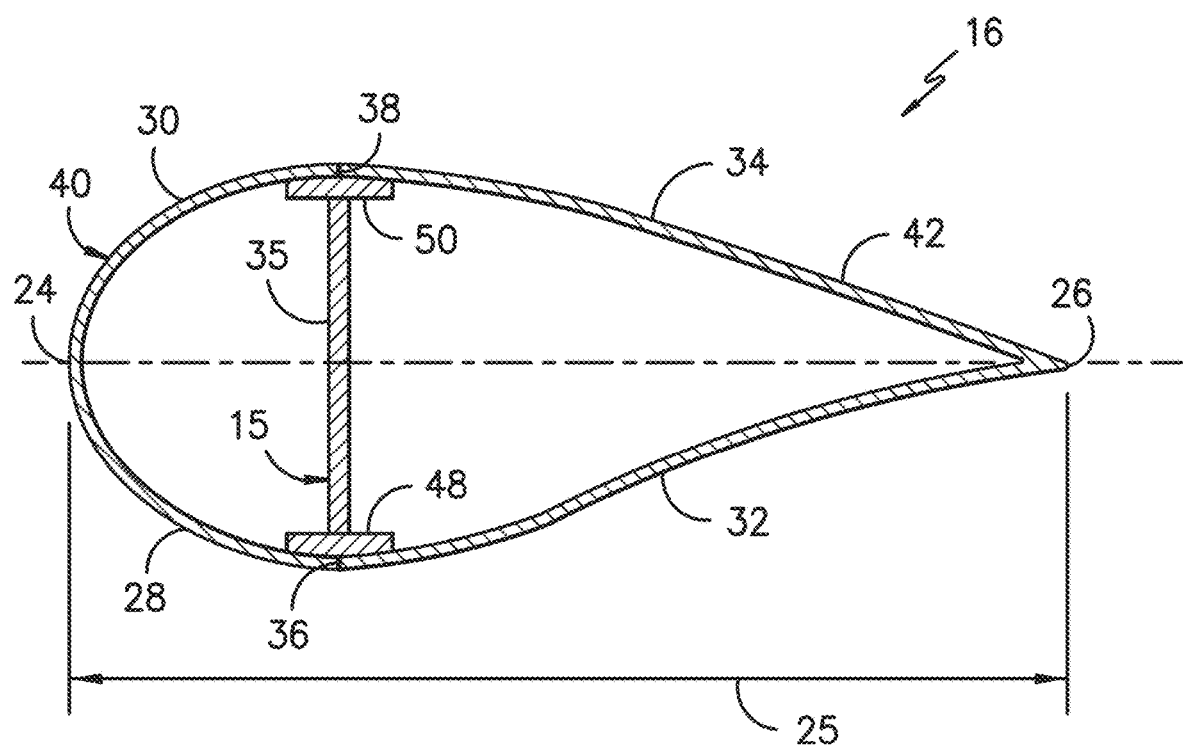
FIG. -6-
(Prior Art)
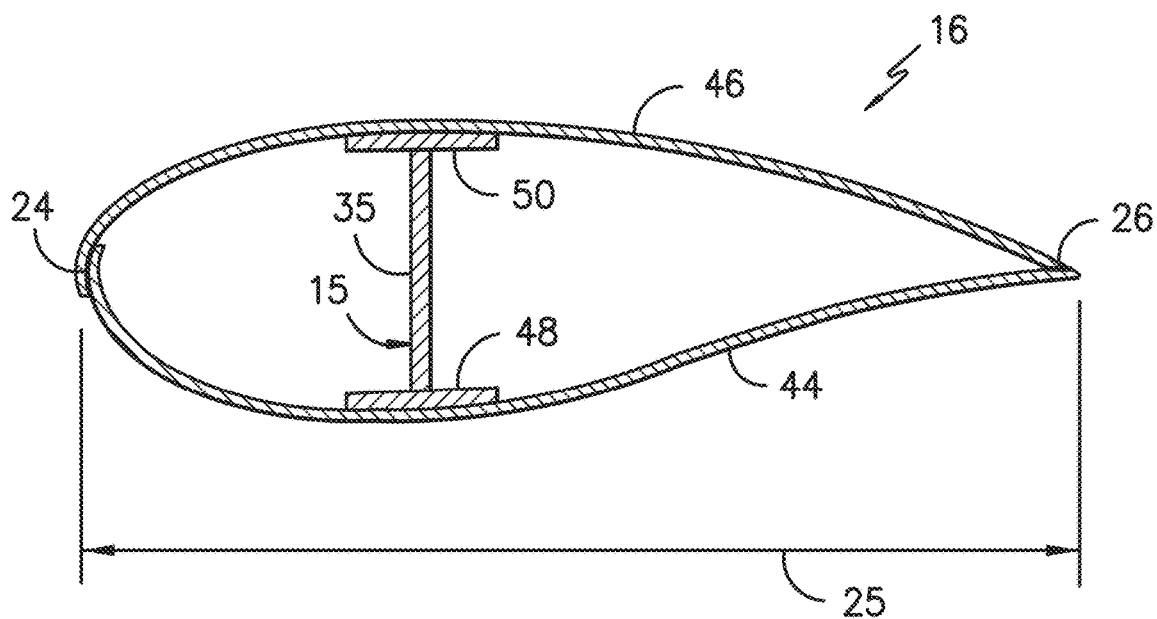
FIG. -7-
(Prior Art)

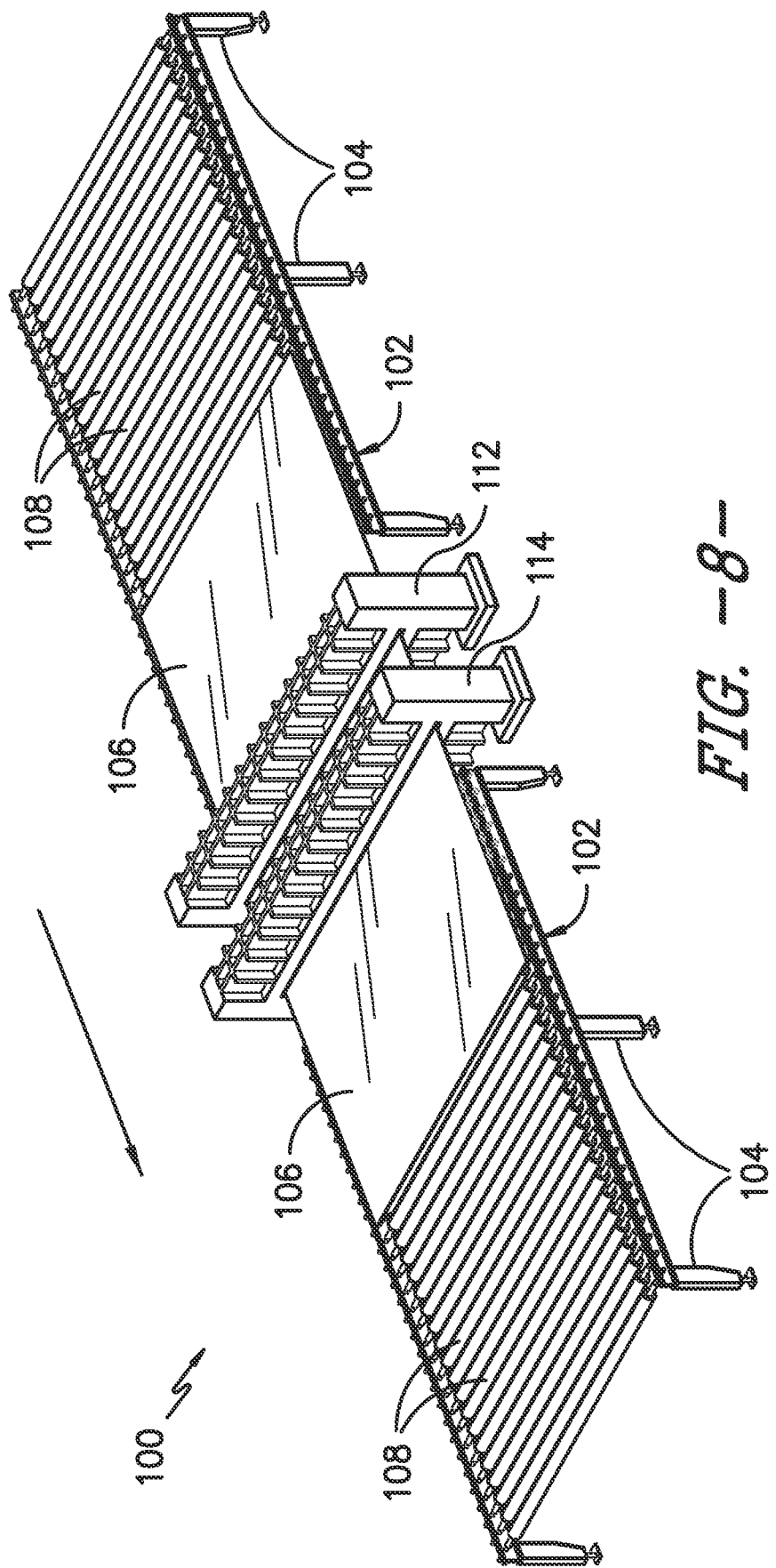
FIG. -8-

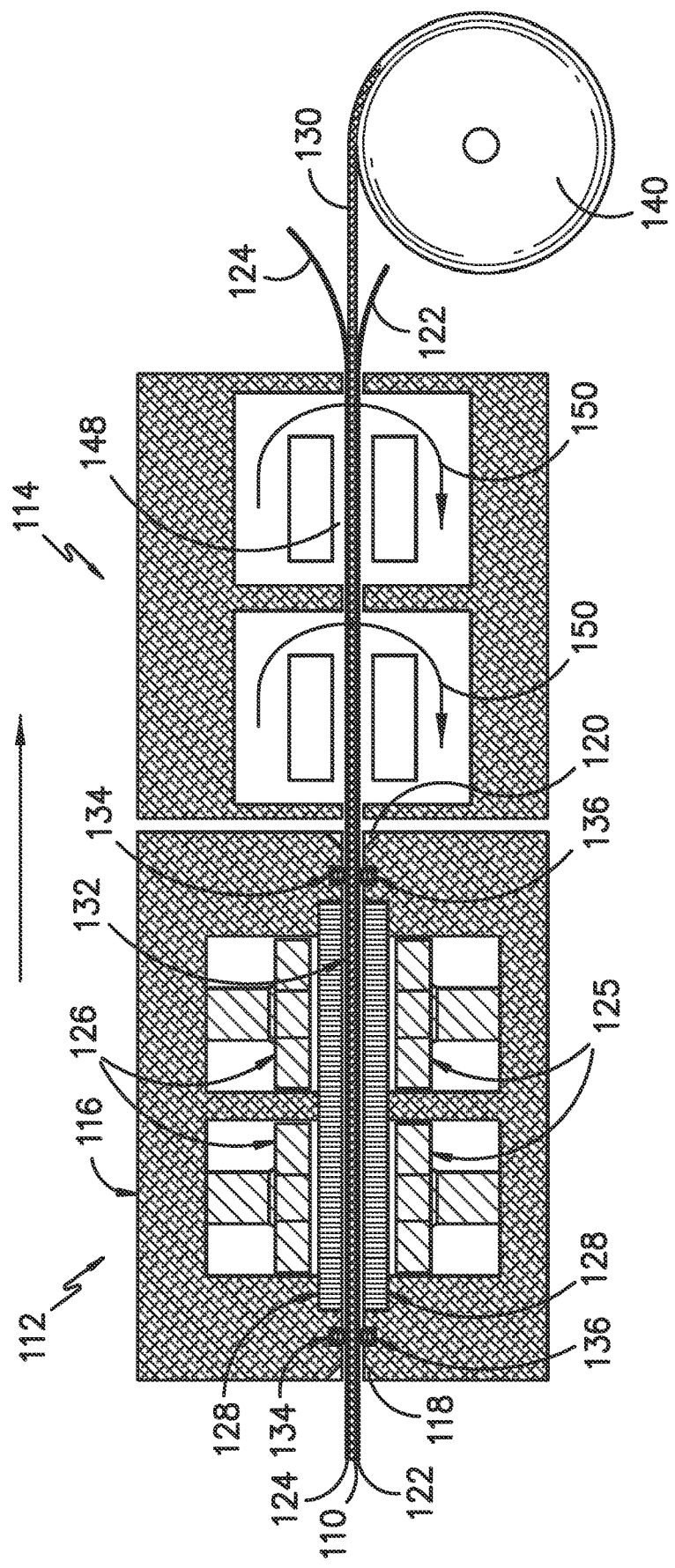
FIG. -9-

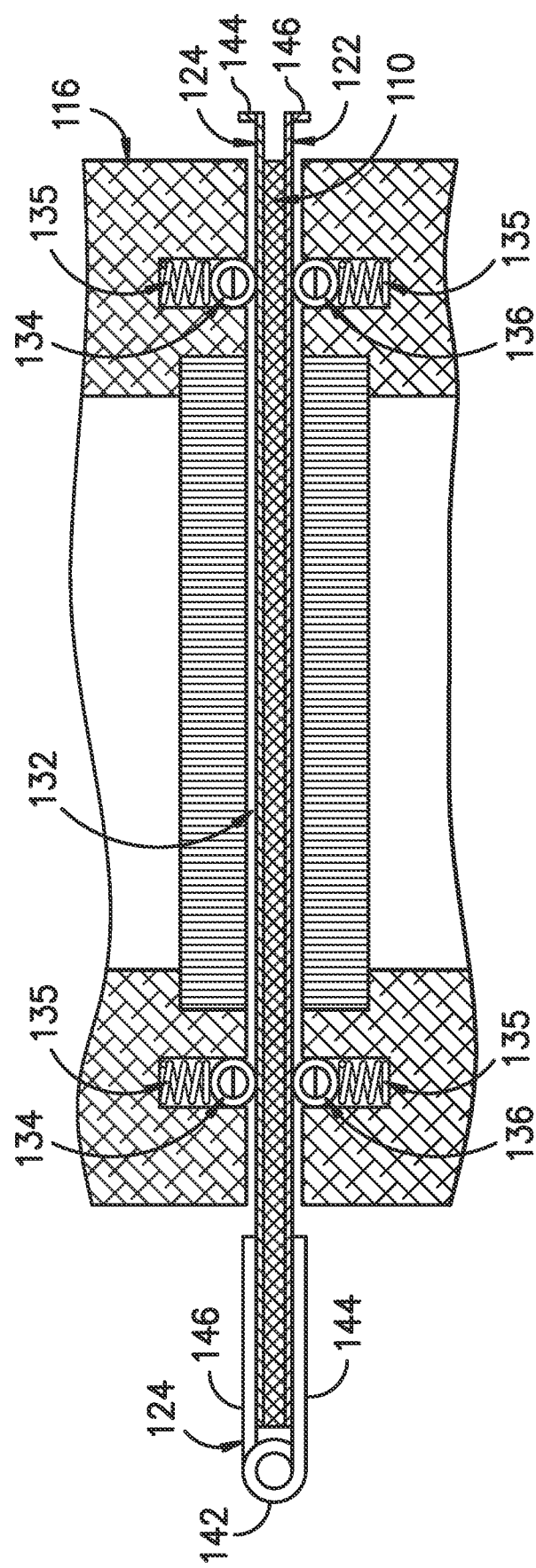
FIG. -10-

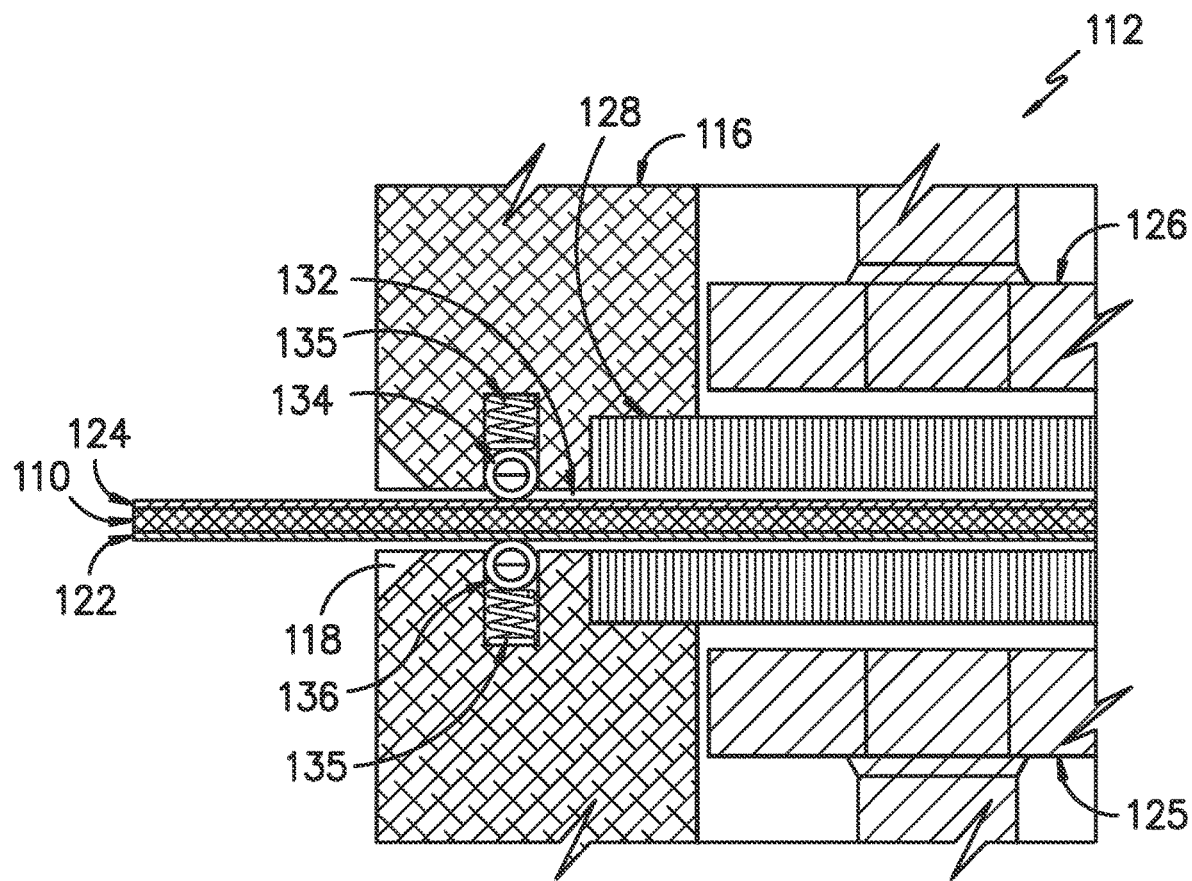
FIG. -11-
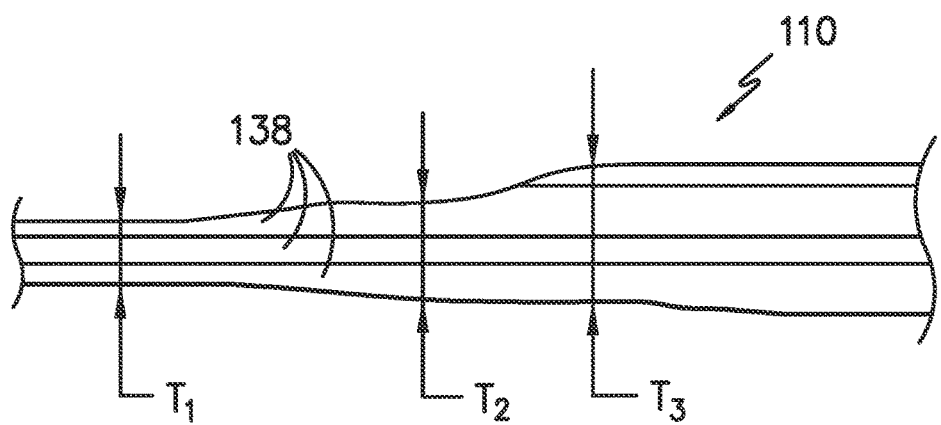
FIG. -12-

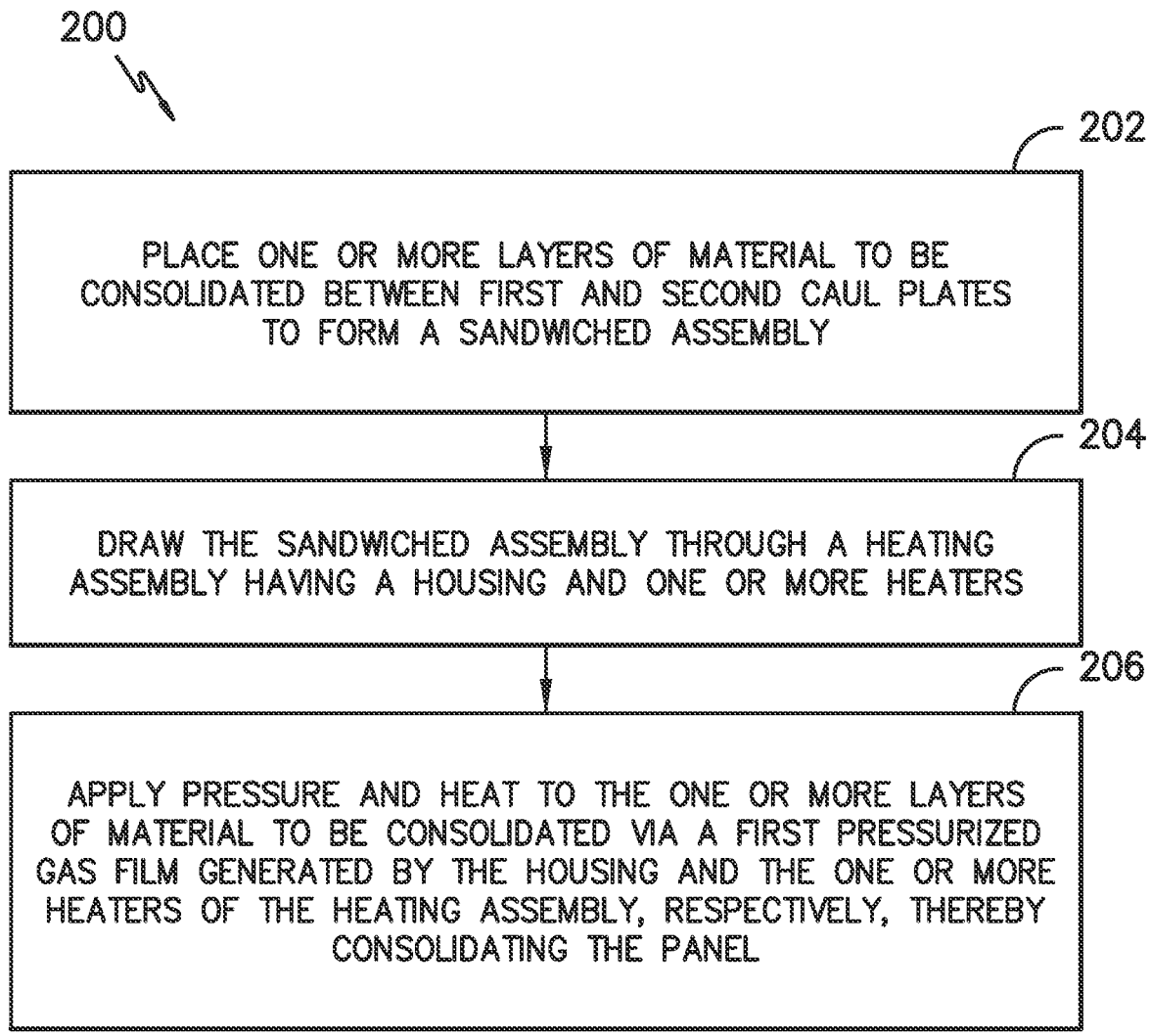
FIG. -13-

SYSTEM AND METHOD FOR MANUFACTURING PANELS FOR USE IN WIND TURBINE ROTOR BLADE COMPONENTS

FIELD

The present disclosure relates in general to wind turbines, and more particularly to systems and methods for manufacturing panels, e.g. that can be used to form wind turbine rotor blade components.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more exterior structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. Accordingly, conventional rotor blades generally have a sandwich panel configuration. As such, conventional blade manufacturing of large rotor blades involves high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

The necessary constituents for manufacturing composite laminates that can be used to construct the blade shells include temperature, pressure, and consolidation time. Thus, by applying and optimizing these three factors to a matrix of fibers and resin, a unified and homogeneous structure can be produced. Due to the large size of wind turbine rotor blades, however, achieving all three factors simultaneously can be difficult or cost prohibitive.

For example, static mechanical hydraulic/pneumatic presses are insufficient for manufacturing large composite laminates for at least two reasons. First, the non-continuous nature of the press means that the press plates must encompass the entire desired size of the laminate. With the targeted size and pressure needed for rotor blades, a machine weighing hundreds of tons would be required, which is impractical and/or uneconomical to operate. The entire press plates would be required to thermally cycle between hot/cold temperatures to consolidate the laminate structure. Changing the temperature of this amount of mass can be impractical and/or uneconomical. For example, multiple presses can be employed, with one being held at a high temperature and another at room temperature. However, this scenario introduces the possibility of fibers being distorted as the material is moved between the hot and cold presses. This scenario also has a very high capital equipment cost.

Other options such as double belt presses also exist. For example, double belt presses use physical contact of continuous metal belts as a means to transmit pressure and temperature from the press structure to the laminate. This results in an imperfect distribution of pressure as the widths are scaled up to very large sizes. Because of friction present between the heated bushings sliding over the continuous belt, there is an upper limit of consolidation pressure due to the tensile strength of the belt. The length of the hot/cold temperature zone is also limited due to this friction. This also produces undesirable wear and tear on the polished continuous metal belts, as well as undesirable effects of scaling. Polymer double belt presses can overcome some of these friction problems but suffer from a temperature limitation (greater than about 250 degrees Celsius (° C.)) due to the belt material.

In view of the foregoing, the art is continually seeking improved systems and methods for manufacturing large flat panels, such as flat composite laminates that can be used to form wind turbine rotor blade shells.

BRIEF DESCRIPTION

Aspects and advantages of the invention will be set forth in part in the following description, or may be obvious from the description, or may be learned through practice of the invention.

In one aspect, the present disclosure is directed to a system for manufacturing a panel e.g. that can be used to form a rotor blade component. The system includes a support frame, a first caul plate arranged atop the support frame, a second caul plate arranged atop the first caul plate, and a heating assembly having a housing defining an inlet and an outlet. The housing includes one or more heaters. The heater(s) is configured to generate heat and the housing is configured to generate a first pressurized gas film. Thus, one or more layers of material to be consolidated may be placed between the first and second caul plates and drawn through the heating assembly as the heating assembly applies pressure to the one or more layers of material to be consolidated via the first pressurized gas film in combination with applying the heat via the one or more heaters, thereby consolidating the panel.

In an embodiment, the system may include a cooling assembly consecutively aligned with the heating assembly for solidifying the panel. In such embodiments, the heating assembly may also include at least one optical window arranged adjacent to the heater(s). As such, the heat from the heater(s) is configured to pass through the optical window(s) and heat the layer(s) of material to be consolidated.

In another embodiment, the cooling assembly is configured to apply a second pressurized gas film to the panel while a chilled air stream is circulated over the panel.

In further embodiments, the heater(s) may include a plurality of first heaters and a plurality of second heaters. In such embodiments, the plurality of first heaters may be arranged below the first caul plate, whereas the plurality of second heaters may be arranged above the second caul plate.

In additional embodiments, the heating assembly may include one or more sealing members between the housing and the first and second caul plates. As such, the sealing member(s) may be configured to provide a sealed environment that can maintain a desired pressure in the heating assembly. In an embodiment, the sealing member(s) may include a first sealing ring and a second sealing ring between the housing and the first and second caul plates.

In several embodiments, the sealing member(s) may be variable height seals. Further, the layer(s) of material to be consolidated may include one or more fiber and/or resin layers having a variable thickness. In such embodiments, the variable height seals are configured to accommodate the variable thickness.

In particular embodiments, the heater(s) may include, for example, radiant heaters or lasers to provide high power density.

In another embodiment, the system may include a spool. In such embodiments, upon cooling, the panel may be separated from the first and second caul plates and spooled onto the spool. In an embodiment, the first and second caul plates may be hinged on one side thereof to facilitate removal of the panel and reinserting additional layers of material to be consolidated to allow for repeat processes.

In further embodiments, the first and second caul plates may be constructed of steel, titanium, or similar.

In an embodiment, the first and second caul plates may be continuous belts that rotate through the heating and cooling assemblies to allow for a continuous process.

In still another embodiment, the first and/or second caul plates may include one or more stiffening ribs to enable handling thereof. In such embodiments, the stiffening rib(s) may be positioned outside of the heating and cooling assemblies.

In yet another embodiment, the support frame may include a plurality of rollers arranged adjacent to the inlet and/or the outlet of the housing of the heating assembly for assisting with drawing the layer(s) of material to be consolidated into and out of the heating assembly.

In another aspect, the present disclosure is directed to a method for manufacturing a panel e.g. that can be used to form of a rotor blade component. The method includes placing one or more layers of material to be consolidated between first and second caul plates to form a sandwiched assembly. The method also includes drawing the sandwiched assembly through a heating assembly having a housing and one or more heaters. Further, the method includes applying pressure and heat to the one or more layers of material to be consolidated via a first pressurized gas film generated by the housing and the one or more heaters of the heating assembly, respectively, thereby consolidating the panel. It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure;

FIG. 7 illustrates a cross-sectional view of the modular rotor blade of FIG. 2 according to the present disclosure;

FIG. 8 illustrates a perspective view of one embodiment of a system for manufacturing a panel for a rotor blade component according to the present disclosure;

FIG. 9 illustrates a cross-sectional view of an embodiment of the heating and cooling assemblies;

FIG. 10 illustrates a cross-sectional view of another embodiment of the caul plates of the system according to the present disclosure;

FIG. 11 illustrates a detailed, cross-sectional view of a portion of another embodiment of a heating assembly according to the present disclosure;

FIG. 12 illustrates a cross-sectional view of one embodiment of a plurality of fiber and/or resin layers used to form the panel according to the present disclosure; and FIG. 13 illustrates a flow diagram of one embodiment of a method for manufacturing a panel for a rotor blade component according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for manufacturing flat panels, such as large, flat composite laminate panels. Such panels, for example, may be used in wind turbine rotor blade applications (e.g. by shaping the flat panels into curved panels), transportation applications, as well as any other industry that can benefit from the use of such panels. Accordingly, in an embodiment, one or more material layers to be consolidated may be stacked and placed between an upper and lower caul plate (e.g. steel/titanium/other). This sandwiched assembly may thus be drawn through a consecutive heating and cooling portal. In this portal, a pressurized thin gas film may be used in combination with energy passed through an optical window for applying pressure and heat to the layers to be consolidated. In certain instances, this permits the simultaneous application of temperature (e.g. of at least about 300° C. for thermoplastics) and pressure (e.g. of from about 30 psi to about 150 psi or any other suitable pressure) to the layers for a desired period of time (e.g. from about 30 seconds to about 500 seconds). High energy heaters can radiate heat through the optical window, which is absorbed by the caul plate/laminate sandwich assembly. Thus, after a sufficient amount of time, for composite laminate panels, the resin reaches its melt temperature and a fully wet out condition and is infused into and among the fiber as it reaches the cooling portal.

The panel can then be cooled as quickly as possible, while maintaining a high pressure to ensure that all voids are minimized. For example, in an embodiment, a cooling assembly may generate a second air bearing gas film plate to apply pressure to the laminate while a chilled air stream is circulated over the panel. Upon cooling, the panel may be separated from the caul plates and spooled up. Thus, in an embodiment, the present disclosure allows the manufacture of large scale panels (e.g. thermoplastic laminate structures) for wind turbine blade skins at significantly improved economics and at a size not previously possible using prior art systems. In addition, the systems and methods of the present disclosure provide uniform consolidation pressure as compared to conventional double belt press manufacturing techniques.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades as well as other applications such as the automotive industry. Further, the methods described herein may also apply to the manufacturing of any similar structure that benefits from printing a structure directly to skins within a mold before the skins have cooled so as to take advantage of the heat from the skins to provide adequate bonding between the printed structure and the skins. As such, the need for additional adhesive or additional curing is eliminated.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic materials as described herein generally encompass a plastic material or polymer that is reversible in nature. Further, the thermoplastic materials as described herein may be in any suitable form such as film, nonwoven, powder, or similar. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, basalt fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8-13, the present disclosure is directed to systems and method for manufacturing a panel that can be used in various wind turbine components, such as the rotor blade shell described herein. For example, as shown in FIG. 8, a perspective view of one embodiment of a system 100 for manufacturing a panel for a rotor blade component is illustrated.

As shown in FIG. 8, the system 100 includes a support frame 102 for supporting the panel (not shown) as the panel is being made as well as supporting the heating 112 and cooling 114 assemblies of the system 100. Thus, as shown, the support frame 102 may have a table-like configuration with legs 104 and a support surface 106. Further, as shown, the support frame 102 may include a plurality of rollers 108 at one or more ends thereof so as to assist with drawing the layer(s) of material 110 to be consolidated into and out of the heating and cooling assemblies 112 and 114, respectively.

Referring now to FIG. 9, a cross-sectional view of an embodiment of a heating assembly 112 and a cooling assembly 114 is illustrated, particularly illustrating the layer(s) of material 110 to be consolidated being drawing into the heating assembly 112. More specifically, as shown, the layer(s) of material 110 to be consolidated may include one or more fiber and/or resin layers 110 that can be sandwiched between a first caul plate 122 and a second caul plate 124. Thus, as shown, the first caul plate 122 is supported directly atop the support frame 102, whereas the second caul plate 124 is supported atop the first caul plate 122 and the layer(s) 110. In certain embodiments, the first and second caul plates 122, 124 may be constructed of steel, titanium, or similar.

In an embodiment, as shown in FIG. 9, the first and second caul plates 122, 124 may be continuous belts that rotate through the heating and cooling assemblies 112, 114 to allow for a continuous process. In another embodiment, as shown in FIG. 10, the first and/or second caul plates 122, 124 may include one or more stiffening ribs 144, 146, e.g. on an outer edge thereof to enable handling thereof. It should be understood that the stiffening ribs 144, 146 may include any suitable rib, protrusion, handle, or similar. In such embodiments, the stiffening rib(s) 144, 146 may be positioned outside of the heating and cooling assemblies 112, 114, e.g. when passing therethrough.

Further, as shown in FIG. 9, the heating assembly 112 may have a housing 116 defining an inlet 118 and an outlet 120. Thus, as shown, the housing 116 includes one or more heaters 125, 126 configured to generate heat, e.g. that can pass through at least one optical window 128. For example, as shown, the heater(s) 125, 126 may include a plurality of first heaters 125 and a plurality of second heaters 126. In such embodiments, the plurality of first heaters 125 may be arranged below the first caul plate 122, whereas the plurality of second heaters 126 may be arranged above the second caul plate 124. In particular embodiments, the heater(s) 125, 126 may include any suitable heater type, such as, for example, radiant heaters or lasers. In such embodiments, where radiant heaters are used, the heat from the heater(s) 125, 126 radiates through the optical window 128 and is absorbed by the first and second caul plates 122, 124 so as to heat the material layer(s) 110. Therefore, the heaters 125, 126 described herein may be non-contact heaters (i.e. the heaters 125, 126 do not contact the layer(s) of material 110 to be consolidated during heating thereof).

By physically separating the heaters 125, 126 from the material/caul plate structure, very high temperature heater elements (e.g. from about 400° C. to about 1200° C.) can be used. This high gradient allows for a more efficient transfer of energy than would otherwise be possible. The frictionless nature of the heaters 125, 126 also allows the continuous free travel of the caul plates 122, 124 through the heating and cooling assemblies 112, 114. The non-contacting heaters 125, 126, therefore, provide an advantage over other conventional systems that would require releasing the pressure before indexing the caul plate to a new location.

In addition, the heating assembly 112 may also include one or more sealing members 134, 136 arranged between the housing and the first and second caul plates 116. In an embodiment, as shown, the sealing member(s) 134, 136 may include a first sealing ring 134 and a second sealing ring 136. Thus, the sealing rings 134, 136 are configured to create a sealed environment between the housing and the first and second caul plates 122, 124 so as to provide pressurized gas (such as air) therebetween. Accordingly, one or more air bearings (also referred to herein as pressurized gas films) may be used to apply pressure to the resin/caul plate structure. Therefore, in such embodiments, the use of a frictionless air bearing in combination with the radiant heaters 125, 126 allows for decoupling of pressure, heat, and time.

Thus, in certain embodiments, the layer(s) of material 110 to be consolidated 110 placed between the first and second caul plates 122, 124 can be drawn at any suitable speed, e.g. such as a constant speed, through the heating assembly 112. Accordingly, the heating assembly 112 is configured to generate and apply pressure to the layer(s) of material 110 to be consolidated via a first pressurized gas film 132 in combination with applying the heat that passes through the optical window(s) 128, thereby forming the panel 130. In an embodiment, the heat and the pressure may be applied simultaneously. Because the pressure is applied over a large surface area (e.g. instead of a line contact), the period of time that the panel experiences a compaction force is increased from a few milliseconds (e.g. when using pinch roller systems) to a period of many seconds dependent upon the processing speed of the layer(s) of material 110 to be consolidated. This order of magnitude increase dramatically increases laminate quality and resin melt wet out of the panel 130.

Referring back to FIG. 8, the system 100 may also include a cooling assembly 114 consecutively aligned with the heating assembly 112. In such embodiments, wherein the layer(s) of material 110 to be consolidated includes fibers and resin, the heat that passes through the optical window(s) 128 is configured to heat the resin to its melting temperature such that the resin is infused into the fiber thereof as the layer(s) of material 110 to be consolidated reaches the cooling assembly 114. In another embodiment, as shown in FIG. 9, the cooling assembly 114 is configured to apply a second pressurized gas film 148 to the panel 130 while a chilled air stream 150 is circulated over the panel 130.

In several embodiments, as shown in FIG. 12, the layer(s) of material 110 to be consolidated may include a plurality of fiber and/or resin layers 138 having a variable thickness (as represented by $T_1$, $T_2$, and $T_3$). In such embodiments, the first and second pressurized gas films 132, 148 are configured to accommodate the variable thicknesses $T_1$, $T_2$, and $T_3$. In other words, the first and second pressurized gas films 132, 148 (isobaric instead of isochoric), allows some flexibility to use ply drops within the panel 130 as the system 100 can accommodate minor thickness changes which typical isochoric belt presses cannot. In addition, in certain embodiments, the first and second pressurized gas films 132, 148 can be adjusted. In such embodiments, as shown particularly in FIG. 11, the sealing members 134, 136 may be variable height seals. For example, as shown, the height of the sealing members 134, 136 may be varied via one or more springs 135. As such, the variable height seals may be employed to maintain an airtight seal over panels 130 of variable thickness.

In another embodiment, as shown in FIG. 9, the system may include a spool 140. In such embodiments, upon cooling, the panel 130 may be separated from the first and second caul plates 122, 124 and spooled onto the spool 140, e.g. for storage. In addition, in an embodiment, as shown in FIG. 10, the first and second caul plates 122, 124 may be hinged (e.g. via hinge 142) on one side thereof to facilitate removal of the panel 130 and reinserting one or more additional materials to be consolidated for repeat processes.

Referring now to FIG. 13, the present disclosure is directed to methods for manufacturing a panel, e.g. for a rotor blade shell and/or blade add-ons. More specifically, as shown, a flow diagram of one embodiment of a method 200 for manufacturing a panel is illustrated. As such, in certain embodiments, the rotor blade shell 21 may define a pressure side shell, a suction side shell, a trailing edge segment, a leading edge segment, or combinations thereof. In general, the method 200 is described herein as implemented for manufacturing panels used in forming the rotor blade shells 21 described above. However, it should be appreciated that the disclosed method 200 may be used to manufacture any other panel. In addition, although FIG. 13 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes placing one or more layer(s) of material 110 to be consolidated between first and second caul plates 122, 124 to form a sandwiched assembly. As shown at (204), the method 200 includes drawing the sandwiched assembly through the heating assembly 112 having a housing and one or more heaters. As shown at (206), the method 20 includes applying pressure and heat to the one or more layers 110 of material to be consolidated via a first pressurized gas film generated by the housing and the one or more heaters of the heating assembly 112, respectively, thereby consolidating the panel 130.

The method 200 may also include subsequently cooling the layer(s) of material 110 to be consolidated via a cooling assembly 114 consecutively aligned with the heating assembly 112 and applying, via the cooling assembly 114, a second pressurized gas film 148 to the panel 130 while a chilled air stream is circulated over the panel 130.

In another embodiment, simultaneously applying the pressure and the heat to the layer(s) of material 110 to be consolidated via the first pressurized gas film 132 and the heating assembly 112, respectively, may include applying the pressure and the heat to both sides of the layer(s) of material 110 to be consolidated. In further embodiments, the method 200 may include sealing the heating assembly 112 via one or more sealing members 134, 136 arranged between the housing 116 and the first and second caul plates 122, 124.

Various aspects and embodiments of the present invention are defined by the following numbered clauses:

Clause 1. A system for manufacturing a panel, the system comprising:
a support frame;
a first caul plate arranged atop the support frame;
a second caul plate arranged atop the first caul plate; and,
a heating assembly comprising a housing defining an inlet and an outlet, the housing comprising one or more heaters, the one or more heaters configured to generate heat, the housing configured to generate a first pressurized gas film;
wherein one or more layers of material to be consolidated is placed between the first and second caul plates and drawn through the heating assembly as the heating assembly applies pressure to the one or more layers of material to be consolidated via the first pressurized gas film in combination with applying heat via the one or more heaters, thereby consolidating the panel.

Clause 2. The system of Clause 1, further comprising a cooling assembly consecutively aligned with the heating assembly for solidifying the panel.

Clause 3. The system of Clause 2, wherein the heating assembly further comprises at least one optical window arranged adjacent to the one or more heaters, the heat from the one or more heaters passing through the at least one optical window and heating the one or more layers of material to be consolidated.

Clause 4. The system of Clause 2, wherein the cooling assembly is configured to apply a second pressurized gas film to the panel while a chilled air stream is circulated over the panel.

Clause 5. The system of any of the preceding Clauses, wherein the one or more heaters further comprises a plurality of first heaters and a plurality of second heaters, the plurality of first heaters arranged below the first caul plate, the plurality of second heaters arranged above the second caul plate.

Clause 6. The system of any of the preceding Clauses, wherein the heating assembly further comprises one or more sealing members between the housing and the first and second caul plates, the one or more sealing members providing a sealed environment that maintains a desired pressure between the housing and the first and second caul plates.

Clause 7. The system of Clause 6, wherein the one or more sealing members comprise a first sealing ring and a second sealing ring between the housing and the first and second caul plates.

Clause 8. The system of Clause 6, wherein the one or more sealing members comprise variable height seals, wherein the one or more layers of material to be consolidated further comprises one or more fiber and/or resin layers having a variable thickness, the variable height seals accommodating the variable thickness.

Clause 9. The system of Clause 2, wherein the one or more heaters comprise at least one of radiant heaters or lasers.

Clause 10. The system of any of the preceding Clauses, further comprising a spool, wherein, upon cooling, the panel is separated from the first and second caul plates and spooled onto the spool.

Clause 11. The system of Clause 10, wherein the first and second caul plates are hinged on one side thereof to facilitate removal of the panel and reinserting one or more additional layers of material to be consolidated layers to for repeat processes.

Clause 12. The system of any of the preceding Clauses, wherein the first and second caul plates are constructed of at least one of steel or titanium.

Clause 13. The system of Clause 2, wherein the first and second caul plates are continuous belts that rotate through the heating and cooling assemblies to allow for a continuous process.

Clause 14. The system any of the preceding Clauses, wherein at least one of the first caul plate or the second caul plate further comprises one or more stiffening ribs to enable handling thereof.

Clause 15. The system of Clause 14, wherein the one or more stiffening ribs are positioned outside of the heating and cooling assemblies.

Clause 16. The system of any of the preceding Clauses, wherein the support frame further comprises a plurality of rollers arranged adjacent to the inlet and/or the outlet of the housing of the heating assembly for assisting with drawing the one or more layers of material to be consolidated into and out of the heating assembly.

Clause 17. A method for manufacturing a panel, the method comprising:
  placing one or more layers of material to be consolidated between first and second caul plates to form a sandwiched assembly;
  drawing the sandwiched assembly through a heating assembly having a housing and one or more heaters; and
  applying pressure and heat to the one or more layers of material to be consolidated via a first pressurized gas film generated by the housing and the one or more heaters of the heating assembly, respectively, thereby consolidating the panel.

Clause 18. The method of Clause 17, further comprising:
  subsequently cooling the one or more layers of material to be consolidated via a cooling assembly consecutively aligned with the heating assembly; and,
  applying, via the cooling assembly, a second pressurized gas film to the panel while a chilled air stream is circulated over the panel.

Clause 19. The method of Clauses 17-18, wherein applying the pressure and the heat to the one or more layers of material to be consolidated via the first pressurized gas film generated by the heating assembly and the one or more heaters of the heating assembly, respectively, further comprises applying the pressure and the heat to both sides of the one or more layers of material to be consolidated.

Clause 20. The method of Clauses 17-19, further comprising sealing the heating assembly via one or more sealing members arranged between the housing and the first and second caul plates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for manufacturing a panel, the system comprising:
  a support frame;
  a first caul plate arranged atop the support frame;
  a second caul plate arranged atop the first caul plate;
  a heating assembly comprising a housing defining an inlet and an outlet, the housing comprising one or more heaters, the one or more heaters configured to generate heat, the housing configured to generate a first pressurized gas film;
  wherein one or more layers of material to be consolidated is placed between the first and second caul plates and drawn through the heating assembly as the heating assembly applies pressure to the one or more layers of material to be consolidated via the first pressurized gas film in combination with applying heat via the one or more heaters, thereby consolidating the panel; and
  wherein the first and second caul plates are hinged on one side thereof to facilitate removal of the panel or reinserting one or more additional layers of material.

2. The system of claim 1, further comprising a cooling assembly consecutively aligned with the heating assembly for solidifying the panel.

3. The system of claim 2, wherein the cooling assembly is configured to apply a second pressurized gas film directly against the first and second caul plates while a chilled air stream is circulated in the cooling assembly.

4. The system of claim 2, wherein the one or more heaters comprise at least one of radiant heaters or lasers.

5. The system of claim 2, wherein the first and second caul plates are continuous belts that rotate through the heating and cooling assemblies to allow for a continuous process.

6. The system of claim 1, wherein the heating assembly further comprises at least one optical window arranged adjacent to the one or more heaters, the heat from the one or more heaters passing through the at least one optical window and heating the one or more layers of material to be consolidated.

7. The system of claim 1, wherein the one or more heaters further comprises a plurality of first heaters and a plurality of second heaters, the plurality of first heaters arranged below the first caul plate, the plurality of second heaters arranged above the second caul plate.

8. The system of claim 1, wherein the heating assembly further comprises one or more sealing members between the housing and the first and second caul plates, the one or more sealing members providing a sealed environment that maintains a desired pressure of the first pressurized gas film against the first and second caul plates.

9. The system of claim 8, wherein the one or more sealing members comprise a first sealing ring and a second sealing ring between the housing and the first and second caul plates.

10. The system of claim 8, wherein the one or more sealing members comprise variable height seals, wherein the one or more layers of material to be consolidated further comprises one or more fiber and/or resin layers having a variable thickness, the variable height seals accommodating the variable thickness.

11. The system of claim 1, further comprising a spool, wherein, upon cooling, the panel is separated from the first and second caul plates and spooled onto the spool.

12. The system of claim 1, wherein the first and second caul plates are constructed of at least one of steel or titanium.

13. The system of claim 1, wherein the support frame further comprises a plurality of rollers arranged adjacent to the inlet and/or the outlet of the housing of the heating assembly for assisting with drawing the one or more layers of material to be consolidated into and out of the heating assembly.

14. A system for manufacturing a panel, the system comprising:
  a support frame;
  a first caul plate arranged atop the support frame;
  a second caul plate arranged atop the first caul plate;
  a heating assembly comprising a housing defining an inlet and an outlet, the housing comprising one or more heaters, the one or more heaters configured to generate heat, the housing configured to generate a first pressurized gas film;

wherein one or more layers of material to be consolidated is placed between the first and second caul plates and drawn through the heating assembly as the heating assembly applies pressure to the one or more layers of material to be consolidated via the first pressurized gas film in combination with applying heat via the one or more heaters, thereby consolidating the panel; and wherein at least one of the first caul plate or the second caul plate further comprises one or more stiffening ribs to enable handling thereof.

15. The system of claim 14, wherein the one or more stiffening ribs are positioned outside of the heating.

* * * * *